(12) United States Patent
Ho

(10) Patent No.: US 7,191,593 B1
(45) Date of Patent: Mar. 20, 2007

(54) ELECTRO-HYDRAULIC ACTUATOR SYSTEM

(75) Inventor: Yuhang Ho, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/288,005

(22) Filed: Nov. 28, 2005

(51) Int. Cl.
*F15B 11/024* (2006.01)
*B24C 13/00* (2006.01)

(52) U.S. Cl. .................. 60/403; 60/468; 60/473; 244/78.1

(58) Field of Classification Search .................. 60/403, 60/405, 464, 467, 468, 472, 473, 475, 476; 91/463; 244/78.1, 226
See application file for complete search history.

(56) References Cited

U.S. PATENT DOCUMENTS

| | | | | |
|---|---|---|---|---|
| 4,696,163 A | | 9/1987 | Glomeau .................. 60/476 |
| 5,072,584 A | * | 12/1991 | Mauch et al. .............. 60/468 |
| 5,351,914 A | * | 10/1994 | Nagao et al. .............. 244/78.1 |
| 5,575,150 A | * | 11/1996 | Vieten et al. .............. 60/476 |
| 6,339,929 B1 | * | 1/2002 | Udagawa et al. .......... 60/468 |
| 6,470,678 B1 | * | 10/2002 | Huber ...................... 60/476 |
| 6,543,223 B2 | | 4/2003 | Muschong et al. ......... 60/476 |
| 6,625,982 B2 | | 9/2003 | Van Den Bossche ...... 60/403 |

* cited by examiner

*Primary Examiner*—Thomas E. Lazo
(74) *Attorney, Agent, or Firm*—Stetina Brunda Garred & Brucker

(57) ABSTRACT

The system includes a hydraulic powered actuator. A pump system having first and second hydraulic lines is coupled to the first and second ports, respectively and is capable of providing hydraulic fluid to either the first and second lines. First and second pressure sensors are coupled to the first and second lines, respectively. A third line is coupled between the first and second lines and includes first and second valves mounted in series therein. Preferably, the first and second valves are capable of latching in the open position. A reservoir is coupled to the third line between the first and second valves. A shut off valve is included for cutting off the flow from the reservoir.

8 Claims, 6 Drawing Sheets

ELECTRO-HYDRAULIC ACTUATOR SYSTEM

BACKGROUND OF THE INVENTION

1. Field of the Invention

The invention relates to the field of hydraulic systems and, in particular, to a system for the control of aerodynamic surfaces and the like on aircraft.

2. Description of Related Art

The hydrostatic actuator is based on applying motive power driven hydraulic pressure directly to the hydraulic cylinder piston without going through a valve. The electro-hydrostatic actuator (EHA) utilizes a pump driven directly by an electric motor to drive the hydraulic piston or motor. The EHA differs from the conventional hydraulic servo actuator in using a motor controller to control both motor speed and direction in accordance with the actuator position sensor and rate command. Applying the EHA to aircraft applications also the posted additional challenge of driving unbalanced piston area cylinder typical found in the aircraft actuation application and the fast response that is required to actuate the flight control surface. There are several implementation options that exist.

For a balanced piston area cylinder, the flow circuit is simpler and can be implemented using a set of back-to-back check valves to handle the minor makeup flow that may have resulted from internal or external leakages. If the low pressure side is below the reservoir pressure, the fluid is flowed through the check valve and the pressure is maintained at the reservoir pressure level. Some tests have shown the stiffness characteristics of this arrangement is acceptable with the cylinder is charged in few excitation cycles and both fluid columns of the cylinder contributed to the stiffness. Such a system is disclosed in U.S. Pat. No. 6,625,982 Electronically Controlled Hydraulic Actuating System by Dominique Alain Van Den Bossche and etc. However, this approach only works for a balanced piston area cylinder, which is not desirable for space limited aircraft applications.

For the unbalanced piston area cylinder, the back-to-back check valves have to be replaced with an anti-cavitations valve. The anti-cavitations valve is a set of pressure actuated check valves. The low pressure side is forced to open to allow fluid flow out from the reservoir to make up the lower flow coming from the smaller piston area. However, this opens the low pressure side to the fluid volume of the reservoir thus lowering the actuator stiffness that is critical for most all flight control actuation applications. Such a system is disclosed in U.S. Pat. No. 6,543,223 Drive Device by G. Muschong, et al. Such a system is also disclosed in U.S. Pat. No. 5,575,150 Stiffness Enhanced Electro-hydrostatic Actuator by Kurt W. Vieten and etc. attempting to block the cylinder flow path in order to maintain stiffness during load cycling.

Thus, it is a primary object of the invention to provide a hydraulic cylinder control system.

It is another primary object of the invention to provide a hydraulic cylinder control system that couples the hydraulic pump directly to the cylinder without the use of a servo-valve.

It is a further object of the invention to provide a hydraulic cylinder control system, which includes a backup system.

It is a further object of the invention to provide an electro-hydrostatic actuator with enhanced stiffness.

It is a further objective of the invention to provide an electro-hydrostatic control system of un-balanced cylinder piston area.

It is a further objective of the invention to use a common hydraulic system to backup multiple electro-hydrostatic actuators.

It is a further objective of the invention to backup the electro-hydrostatic actuator using modulating valves.

It is a further objective of the invention to maintain low parts count for high reliability.

SUMMARY OF THE INVENTION

The invention is an electro-hydrostatic actuator (EHA) system for actuating a hydraulic cylinder. In particular, it has application to a movable control surface of an aircraft, subject to an aerodynamic load. In detail, the system includes a hydraulic powered actuator having a piston, and piston rod with first and second ports located on either side of the piston for receiving hydraulic fluid. The piston may have both balanced and unbalanced cross-sectional areas. A position sensor is mounted on the actuator for monitoring the position thereof; that is the position of the extension and retraction of the piston rod.

A pump system having first and second hydraulic lines is coupled to the first and second ports, respectively and is capable of providing hydraulic fluid to either the first and second lines. First and second pressure sensors are coupled to the first and second lines, respectively. A third line is coupled between the first and second lines and includes first and second valves mounted in series therein. Preferably, the first and second valves are capable of latching in the open position. A reservoir is coupled to the third line between the first and second valves. A shut off valve is included for cutting of the flow from the reservoir. In addition, an isolation valve is mounted between the first and second lines and the pump system so that the pump system can be isolated from the first and second lines.

A control system means for monitoring the pressure sensors, the position sensors, and for controlling the opening and closing of the first and second valves. It also controls the output of the pump system in response to a command signal. The EHA system also includes first and second pressure relief valves coupled to the first and second lines, respectively.

A backup system is included should the pump system fail. This is accomplished by the installation of a fourth line mounted between the first and second lines having third and forth valves mounted in series therein. A fifth line is coupled to the fourth line at one end and to a second reservoir and pump in series. A sixth line is connected from the outlet of the pump to the fourth line between the first and second valves. A second control system is provided for controlling the position of the first, second, third and fourth valves and the second pump. The fifth and sixth lines incorporate a second isolation valve to isolate the second pump and second reservoir until operation of the back up system is required. The backup system is normally isolated by maintaining an isolation valve through which the fifth and sixth lines pass in the closed position.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

In the normal operation mode, the EHA operates novel features of modulating first and second valve in accordance with the first and second pressure sensor to control the flow into or exit from the reservoir. This novel approach enables full control of the fluid pressure and reduces the fluid volume that can degrade the hydraulic stiffness of the actuator.

In the backup mode, the hydraulic cylinder is driven by a conventional hydraulic power supply that can be electrically driven by a motor or from a prime power source such as the main engine. Same first and second modulating valves are used to meter the flow in and out of the hydraulic cylinder in a servo control operation.

DESCRIPTION OF THE PREFERRED EMBODIMENT

Figure 1:
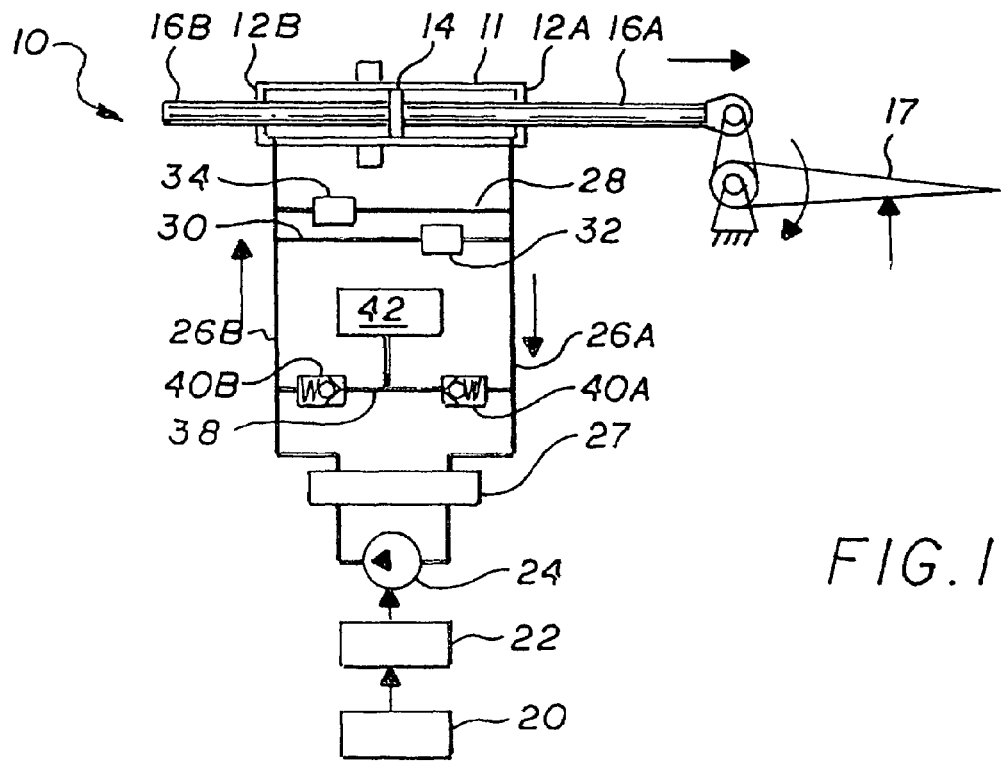
FIG. 1 is a schematic of a prior art system wherein the piston areas of the hydraulic cylinder are balanced.

Referring to FIG. 1, the prior art EHA comprised a hydraulic actuator 10 comprising a hollow cylinder 11 having first and second ends 12A and 12B, respectively. A piston 14 is movable mounted within the cylinder 11 and includes a piston rod 16A that extends out of the first end 12A and is coupled to an aerodynamic surface 17. A second piston rod 16B extends out the end 12B, thus the piston 14 has balanced surface areas. That is equal hydraulic flow on each side of the piston 14. A motor controller 20 is coupled to a motor 22, which in turn drives a hydraulic pump 24. The pump 24 is connected by lines 26A and 26B to ends 12A and 12B of the hydraulic cylinder 11. In normal operation, the lines 26A and 26B pass through an isolation valve 27. Hydraulic lines 28 and 30 having pressure relief valves 32 and 34 therein couple lines 26A and 26B together to bypass transient high pressure pulses. Because the piston has balanced surface areas, small make-up flow may be required from the reservoir 42 to compensate flow leakage. A line 38 incorporating a pair of back to back check valves 40A and 40B also couples line 26A and 26B together connects to the reservoir 42. A reservoir 42 is coupled to line 38 between the check valves 40A and 40B.

Figure 2:
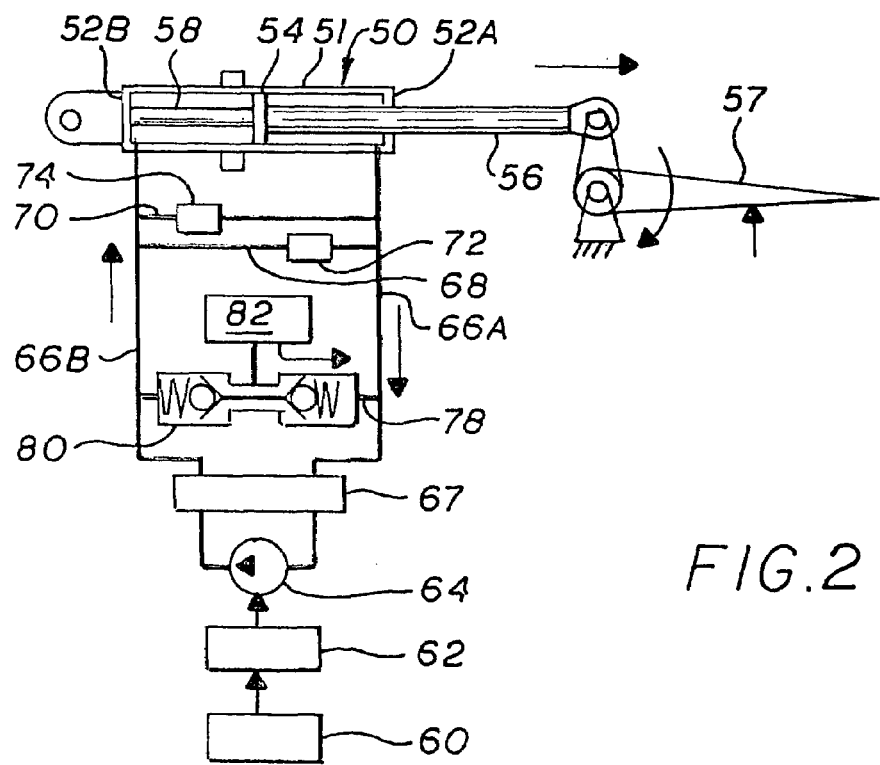
FIG. 2 is a schematic of a prior art system wherein the piston areas of the hydraulic cylinder are unbalanced.

A second prior art EHA is shown in FIG. 2. A hydraulic actuator 10 comprising a hollow cylinder 51 having first and second ends 52A and 52B, respectively. A piston 54 is movable mounted within the cylinder 51 and includes a piston rod 56 that extends out of the first end 52A and is coupled to an aerodynamic surface 57. A position indicator 58 is mounted on the opposite side of the piston 54 having a lower cross-section area than the piston rod 56. Thus the piston areas are unbalanced, in that equal hydraulic pressure on either side of the piston will produce a net force. A motor controller 60 is coupled to a motor 62, which in turn drives a hydraulic pump 64. The pump 64 is connected by lines 66A and 66B to ends 52A and 52B of the hydraulic cylinder 51. In normal operation, the lines 66A and 66B pass through an isolation valve 67. Hydraulic lines 68 and 70 having pressure relief valves 72 and 74 therein couple lines 66A and 66B together to bypass transient high pressure pulses. Because the piston is unbalanced a line 78 is connected between lines 66A and 66B incorporating a pressure activated anti-cavitations valve 80, instead of the two check valves 40A and 40B shown in FIG. 1. A reservoir 82 is coupled to the anti-cavitations valve 80.

For a balanced piston area cylinder system shown in FIG. 1, the flow circuit is simpler and as illustrated by back-to-back check valves 40A and 40B to handle the minor makeup flow that may resulted from internal or external leakages from lines and the cylinder 11. If the low pressure side line 26B is below the reservoir 42 pressure, the fluid is flown through the check valve 40A and the pressure is maintained at the reservoir pressure level.

For the unbalanced piston area cylinder 51 shown in FIG. 2, the low pressure side of the anti-cavitations valve 80 is forced to open to allow fluid flow out from the reservoir 82 to make up the lower flow coming from the smaller piston area. However, this opens the low pressure side 56B to the fluid volume of the reservoir, thus lowering the actuator stiffness that is critical for most of the flight control actuation applications.

Figure 3:
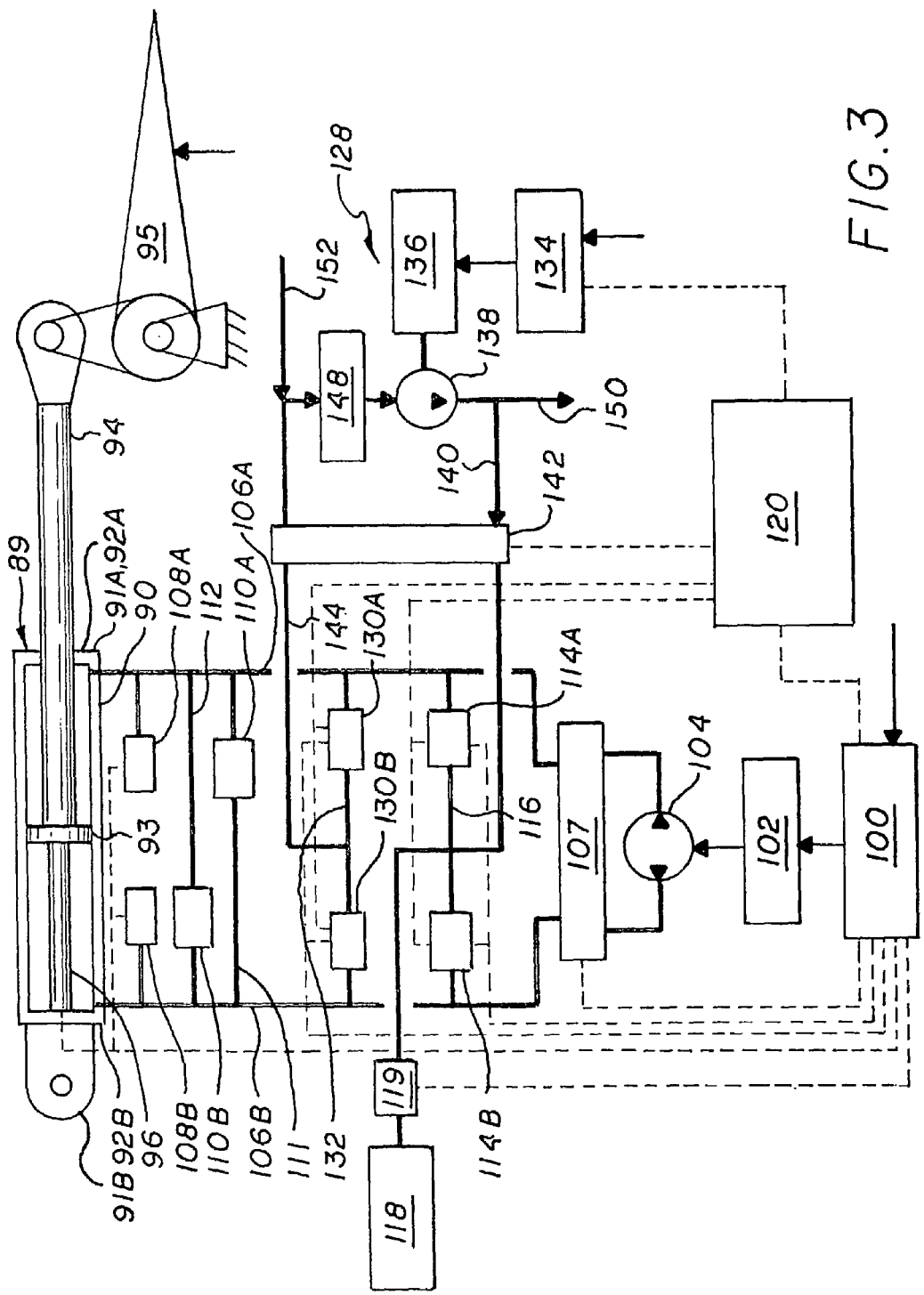
FIG. 3 is a schematic of the subject system including a backup system.

The subject invention eliminates the short comings of these systems. Referring to FIG. 3, the system includes a hydraulic actuator 89 having first and second ends 91A ad 91B with ports 92A and 92B, respectively. A piston 93 is mounted in the cylinder 90 and is connected to a piston rod 94 coupled to a control surface 95. The cylinder 90 further includes the position indicator 96 and thus has unbalanced piston areas. A motor controller 100 controls a motor 102 that drives a hydraulic pump 104. The pump 104 is connected by hydraulic lines 106A and 106B to ports 92A and 92B, respectively, in the cylinder 90. The lines 106A and 106B pass through an isolation valve 107, which is commanded by the EHA motor controller 100. The isolation valve 107 is normally closed when command power is removed. In the event of EHA failure caused by the pump 104, motor 102, or motor controller 100, the isolation valve 107 prevents pressure fluctuations downstream thereof from reaching the pump 104. First and second pressure sensors 108A and 108B are connected to the lines 106A and 106B. A pressure relief valve 110A is connected between lines 106A and 106B by line 111 and adapted to relieve any over pressure in line 106A to line 106B. A second pressure relief 110B is also coupled between 106A and 106B via line 112 and is adapted to relieve over pressure in line 106B to line 106A.

First and second binary valves 114A and 114B are connected in series between lines 106A and 106BB via line 116. The binary valves are latching type solenoid valves. That is once opened; they can be made to latch in that position. A hydraulic fluid reservoir 118 is connected via a shut off valve 119 to line 116 between the first and second binary valves 114A and 114B. Finally, the vehicle managements computer (VMC) 120, which receives input from the pilot provides over all control over all the flight controls of the aircraft and provides input to the motor controller 100. The pressure sensors 108A and 108B, binary valves 114A, 114B, 130A, and 130B, position indicator 96, shut off valve 119 are all connected to the motor controller 100. The motor controller 100 and binary valves 114A and 114B are also connected to the VMC 120.

Figure 4:
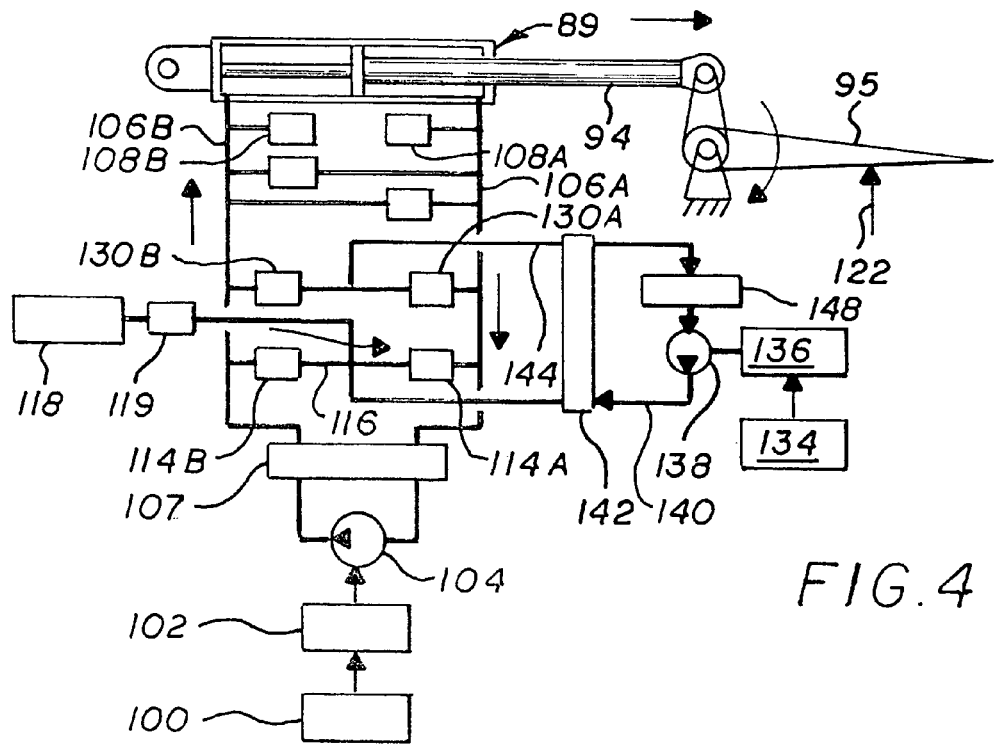
FIG. 4 is a schematic of the subject system including a backup system illustrating the condition of the system when the hydraulic cylinder is extending and the load of the control surface is opposing the movement of the surface.

The system so far described is a significant improvement over the previously discussed prior art systems, in that this one system can accommodate both balanced and unbalanced piston area hydraulic actuators. Referring to FIG. 4, in the case where hydraulic actuator 89 is extending the piston rod 94 to rotate the surface 95 against a load 122, the demand for fluid flow in line 106B increases. The demand from line 106B is sensed by pressure sensor 108A (sensing the drop in pressure in line 106A). A signal is sent to the motor controller 102 which in turn send a signal to the binary valve 114A causing it to open and allow hydraulic fluid from the reservoir 118 to flow into line 106A, such that the demand of the pump 104 is met.

Figure 5:
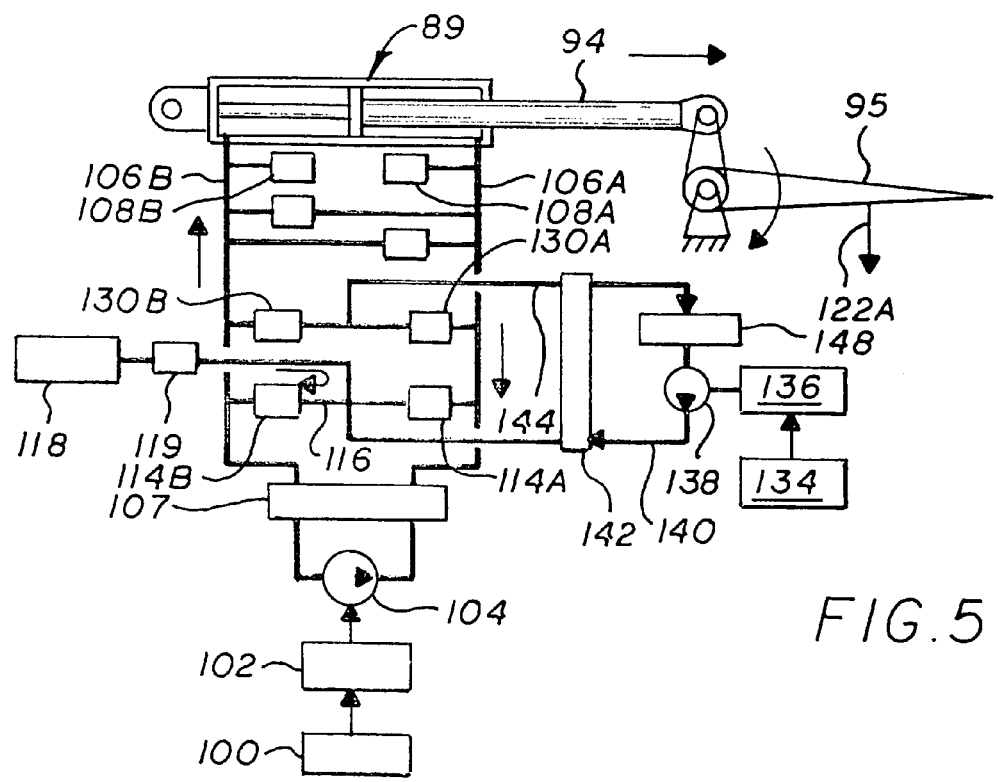
FIG. 5 is a schematic of the subject system including a backup system illustrating the condition of the system when the hydraulic cylinder is extending and the load of the control surface is aiding the movement of the surface.

Referring to FIG. 5, in the case where the piston rod 94 is extending and the load 122A is in the direction of surface 95 movement, there is a demand for fluid flow in line 106A. Thus binary valve 114B is opened and binary valve 114A is closed allowing fluid to flow from the reservoir into line 106B and to the actuator 89. In this mode, the pump 104 is been back-driven by the flow from line 106A.

Figure 6:
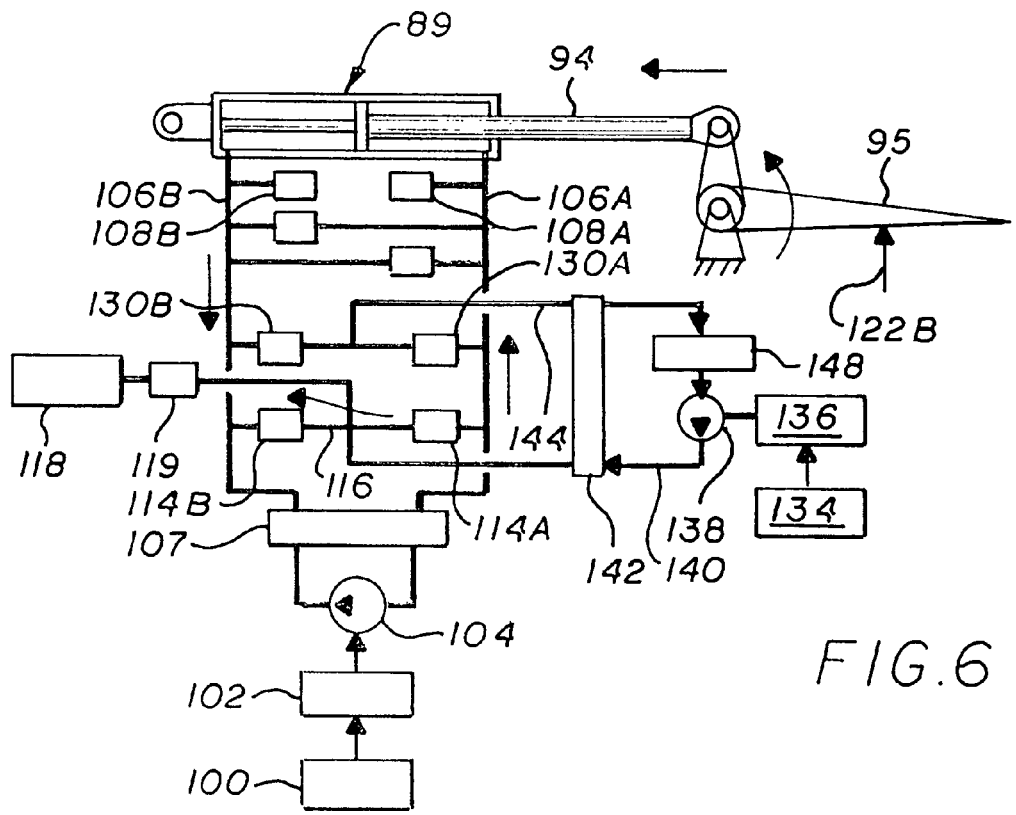
FIG. 6 is a schematic of the subject system including a backup system illustrating the condition of the system when the hydraulic cylinder is retracting and the load of the control surface is aiding the movement of the surface.
Figure 7:
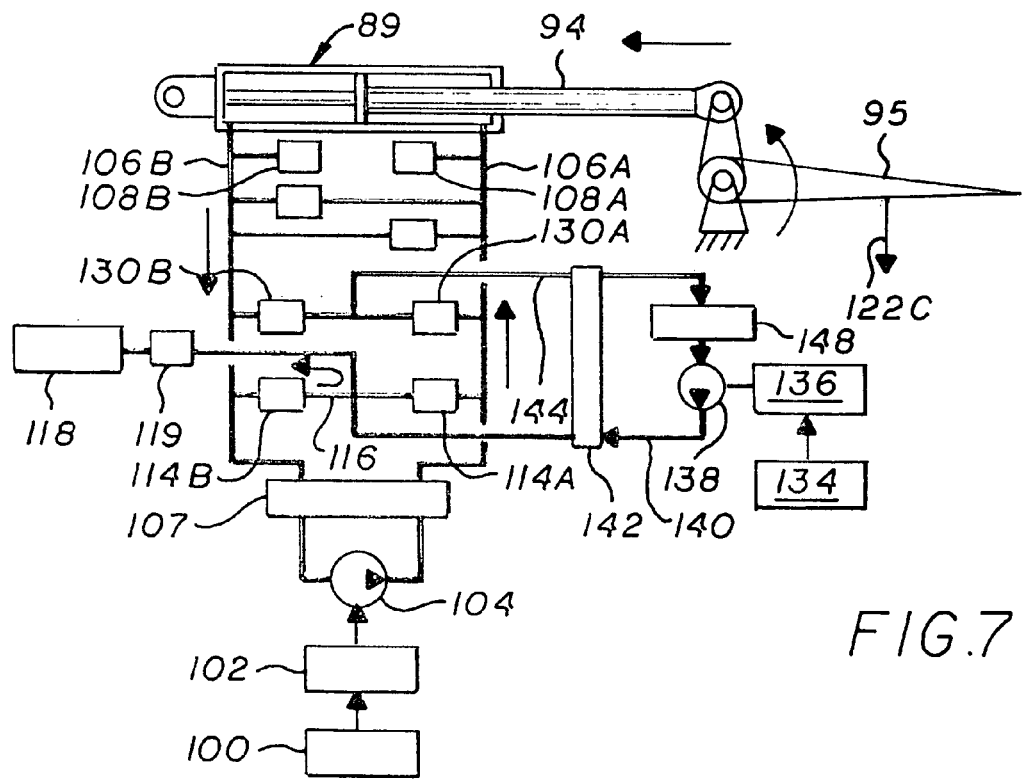
FIG. 7 is a schematic of the subject system including a backup system illustrating the condition of the system when the hydraulic cylinder is retracting and the load of the control surface is opposing the movement of the surface.

Referring to FIG. 6, in the case where the hydraulic actuator 89 is retracting the piston rod 94 and the load 122B is in the direction of rotation of the surface 95, the demand for fluid flow in line 114A is met by the flow from line 106A. Therefore, binary valve 114A is opened and binary valve 114B is closed and excess flow from the pump 104 through line 106A can flow into the reservoir 118. Finally, referring to FIG. 7, where the hydraulic actuator 89 is retracting the piston rod 94 and load 122C on the surface 95 is resisting the movement, Pump 104 is being driven to pump flow into line 106A. The flow out of actuator 89 through 106B has more flow than needed to feed line 106A so binary valve 114B is opened and binary valve 114A is closed allowing flow from line 106B to the reservoir 18. The flow demand is sensed by pressure sensor 108B that pressure in line 106B is high thus venting flow back to the reservoir 118 is required.

The above system as described is a significant improvement over the previously described prior art. This is because the above system works even if the piston 94 areas are unequal. The system pressure is controlled continuously and the fluid volume of reservoir 118 is isolated from lines 106A or 106B, thus maintaining system stiffness. This is because pressure level is sensed in lines 106A and 106B and binary valves 114A and 114B can individually be controlled.

Referring back to FIG. 3, a backup system, indicated by numeral 128 is provided that includes an additional pair of binary valves 130A and 130B mounted in series in a line 132 connected between lines 106A and 106B. A motor controller 134 coupled to a motor 136, which in turn is coupled to a hydraulic pump 138. A line 140 connects the pump 138 via an isolation valve 142 to the line 132 between the binary valves 130A and 130B. A line 144 is connected to line 132 between binary valves 114A and 114B connects to isolation valve 142, a reservoir 148 and back to pump 138. The isolation valve 142 and binary valves 130A and 130B, and motor controller 134 also are connected to the VMS 120. Should a failure occur, the isolation valve 107 is closed isolating the pump 104 and the back up system 128 is connected by opening isolation valve 142 and operation is as follows.

Figure 8:
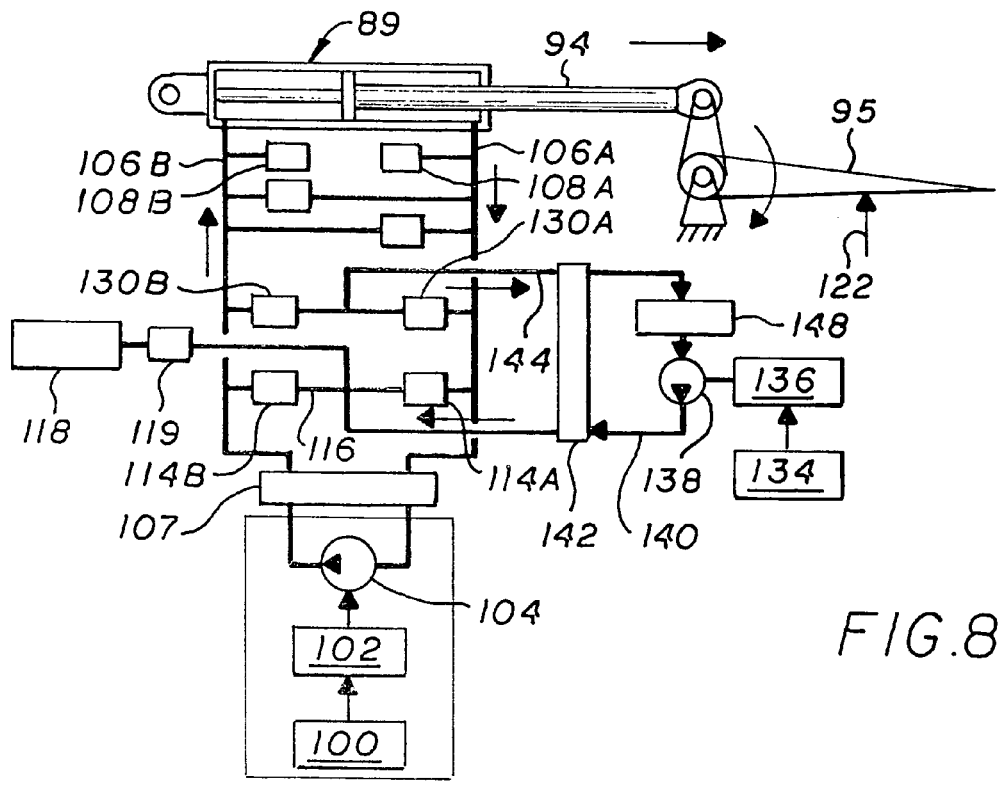
FIG. 8 is a schematic of the subject system including with the backup system in operation illustrating the condition of the system when the hydraulic cylinder is extending and the load of the control surface is opposing the movement of the surface.
Figure 9:
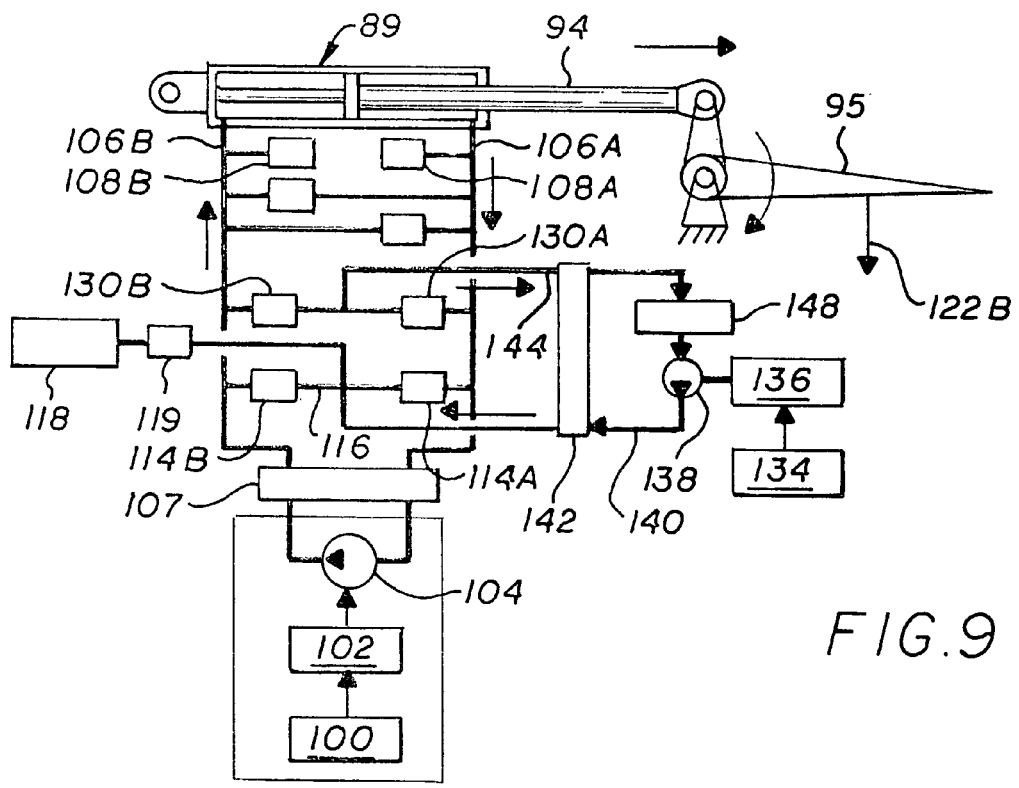
FIG. 9 is a schematic of the subject system including a backup system in operation illustrating the condition of the system when the hydraulic cylinder is extending and the load of the control surface is aiding the movement of the surface.
Figure 10:
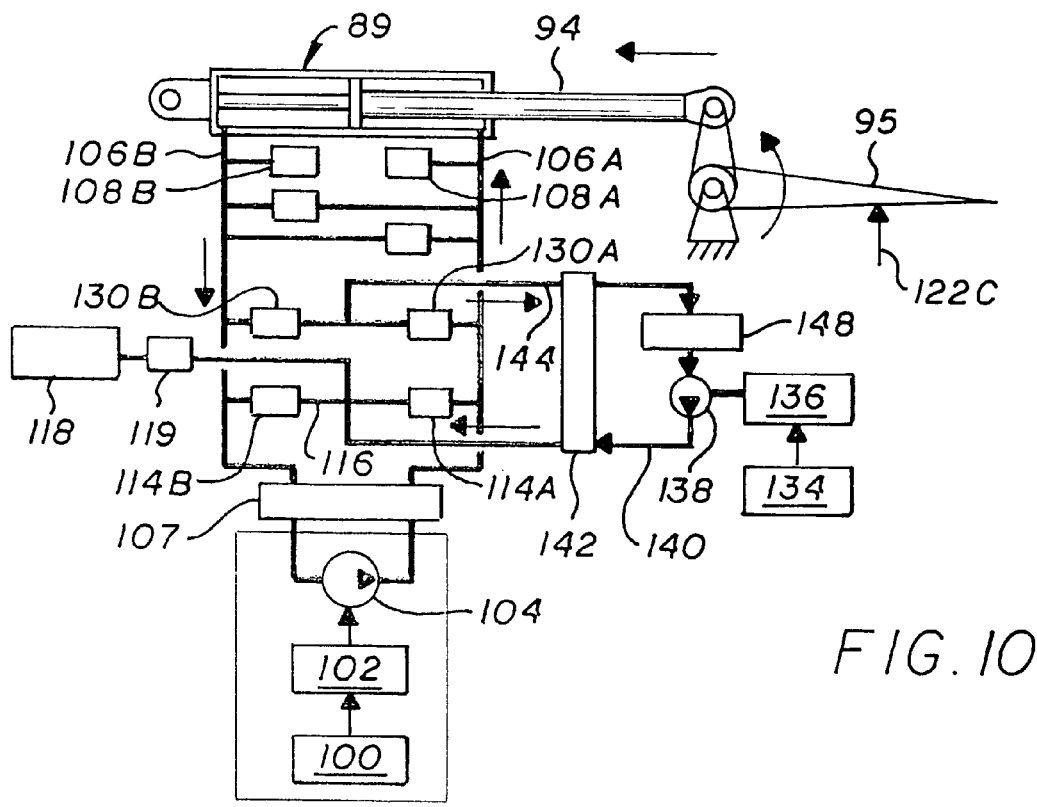
FIG. 10 is a schematic of the subject system including a backup system in operation illustrating the condition of the system when the hydraulic cylinder is retracting and the load of the control surface is aiding the movement of the surface.

Referring to FIG. 8, in the case when hydraulic actuator 89 is commanded to extend the piston rod 94 to rotate the surface 95 against a load 122, the demand for fluid flow in line 106B increases. The binary valve 114B is opened as well as binary valve 130A. Thus flow form pump 138 is into line 106B and the fluid in the actuator 89 returned to the reservoir 148 from line 106A. In FIG. 9, in the case where the piston rod 94 is extending and the load 122B is in the direction of surface 95 movement, there is a demand for fluid flow in line 106B. Thus binary valve 130A is opened allowing fluid flow from line 106A to the reservoir 148 and binary valve 114B is opened allowing fluid to flow to line 106B from the pump 138. The binary valve 130B can also be modulated to circulate fluid flow from binary valve 130A thus saving the pumping energy required by pump 138. In FIG. 10, in the case where the hydraulic actuator 89 is commanded to retract the piston rod 94 and the load 122C is in the direction of rotation of the surface 95, the valve 114A is opened allowing flow from the pump 138 to line 106A and valve 130B is also opened allowing flow from line 106B to the reservoir 148.

Figure 11:
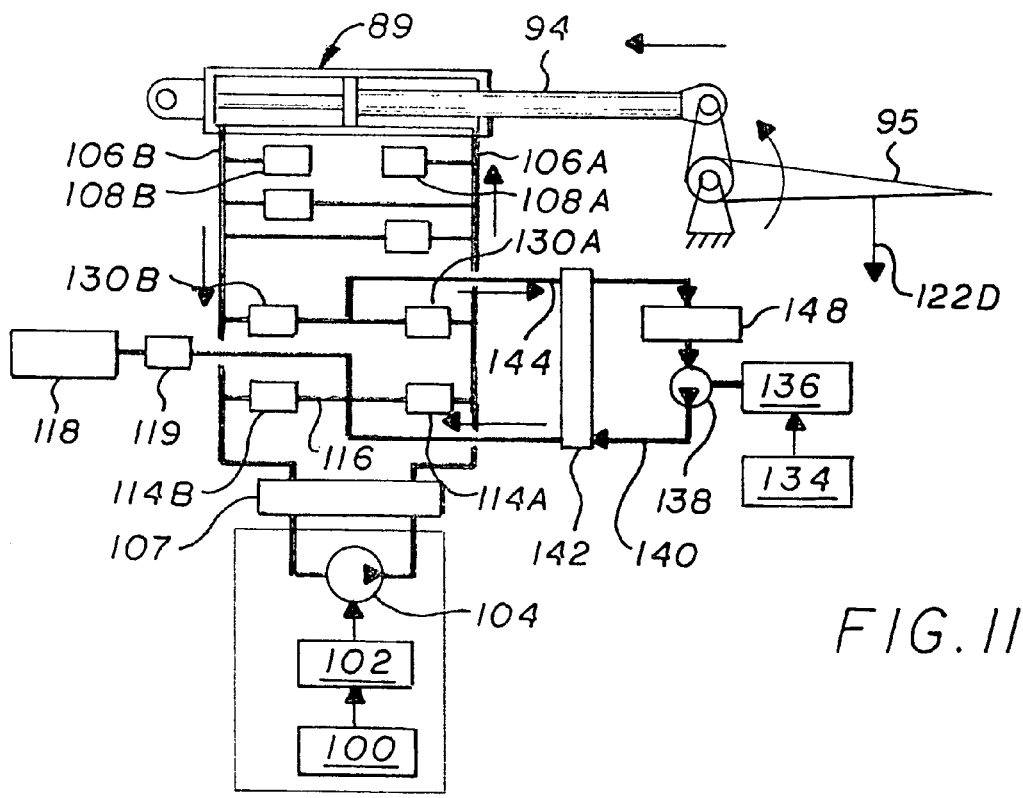
FIG. 11 is a schematic of the subject system including a backup system in operation illustrating the condition of the system when the hydraulic cylinder is retracting and the load of the control surface is in the opposing the movement of the surface.

Finally, referring to FIG. 11, where the hydraulic actuator 89 is retracting the piston rod 94 and load 122D on the surface 95 is resisting the movement, binary valve 114A is opened allowing flow from pump 138 to reach line 106A and binary valve 130B is opened to allow flow from line 106B to the reservoir 148. In the back up mode, the VMC 120 relies on the position indicator 96 and not on the pressure sensors 108A and 108B to determine valve position and modulation duty cycles.

Thus it can be seen that a single system design can be use for hydraulic cylinders having either balanced or unbalanced piston areas. Furthermore, the backup system can be used to provide support for other flight control actuators. This can be seen in FIG. 3, where the output from the pump 138 is indicated by arrow 150 as providing hydraulic fluid to other actuators and the reservoir 148 is shown receiving hydraulic fluid from other actuators, indicated by arrow 152.

While the invention has been described with reference to particular embodiment, it should be understood that the embodiments are merely illustrative as there are numerous variations and modifications, which may be made by those skilled in the art. Thus, the invention is to be construed as being limited only by the spirit and scope of the appended claims.

INDUSTRIAL APPLICABILITY

The invention has application to the aircraft manufacturing industry.

The invention claimed is:

1. An electro-mechanical hydraulic system comprising;
   a hydraulic powered actuator having first and second ports for receiving hydraulic fluid for extending and retracting the actuator, respectively;
   position sensor means for monitoring the position of said actuator;
   a pump system having first and second hydraulic lines coupled to said first and second ports, respectively; said pump system capable of providing hydraulic fluid to either said first and second lines;
   first and second pressure sensors coupled to said first and second lines, respectively;
   a third line coupled between said first and second lines;
   first and second valves mounted in series in said third line;
   a reservoir coupled to said third line between said first and second valves; and
   control means for monitoring said pressure sensors and said position sensor means and controlling the opening and closing of said first and second valves and the output of said pump means in response to a command signal.

2. The system as set forth in claim 1 wherein said fist and second valves are capable of latching in the open position.

3. The system as set forth in claim 2 comprising first and second pressure relief valves coupled to said first and second lines, respectively.

4. The system as set forth in claim 3 comprising an isolation valve mounted between said first and second lines and said pump means.

5. The system as set forth in claim 4 comprising a shut off valve mounted in said third line controlling fluid flow to and from said reservoir.

6. The system as set forth in claim 1, or 2, or 3, or 4, or 5, further comprising a back up system comprising:
   a fourth line mounted between said first and second lines;
   third and forth valves mounted in series in said fourth line;
   a fluid control system having a fifth line coupled to said third line between said first and second valves and a sixth line coupled to said fourth line between said third and fourth valves.

7. The system as set forth in claim 6 wherein said fluid control system comprises:
   a second pump system having an inlet and outlet, said output coupled to said fifth line;
   a reservoir having an inlet coupled to said sixth line and an outlet coupled to said inlet of said pump system; and
   a second control system for controlling the position of said first, second, third and fourth valves and said second pump system.

8. The system as set forth in claim 7 comprising said fluid control system including an isolation valve for controlling fluid flow into said reservoir and from said second pump system.

* * * * *